United States Patent
Daily et al.

[11] Patent Number: 5,914,603
[45] Date of Patent: Jun. 22, 1999

[54] ELECTRICAL RESISTANCE TOMOGRAPHY USING STEEL CASED BOREHOLES AS ELECTRODES

[75] Inventors: William D. Daily, Livermore; Abelardo L. Ramirez, Pleasanton, both of Calif.

[73] Assignee: The Regents of the University of California, Oakland, Calif.

[21] Appl. No.: 08/804,163

[22] Filed: Feb. 20, 1997

[51] Int. Cl.$^6$ .............................. G01V 3/02; G01V 3/04; G01V 3/06; G01V 3/18

[52] U.S. Cl. ............................ 324/357; 324/368

[58] Field of Search .................................... 324/357, 368, 324/354, 355

[56] References Cited

U.S. PATENT DOCUMENTS

| | | | |
|---|---|---|---|
| 2,408,593 | 5/1946 | Nuefeld | 324/368 |
| 4,796,186 | 1/1989 | Kaufman | 364/422 |
| 4,820,989 | 4/1989 | Vail, III | 324/368 |
| 4,882,542 | 11/1989 | Vail, III | 324/368 |

OTHER PUBLICATIONS

UCRL–JC–121653, "Resistivity Imaging Using A Steel Cased Well", C.J. Schenkel, Jun. 1995.
D.J. LaBrecque et al., "The Effects of Noise on Occam's Inversion of Resistivity Tomography Data", Geophysics, vol. 61, No. 2 (Mar.–Apr.) 1996, pp. 538–548.

*Primary Examiner*—Walter E. Snow
*Attorney, Agent, or Firm*—L. E. Carnahan

[57] ABSTRACT

An electrical resistance tomography method using steel cased boreholes as electrodes. The method enables mapping the electrical resistivity distribution in the subsurface from measurements of electrical potential caused by electrical currents injected into an array of electrodes in the subsurface. By use of current injection and potential measurement electrodes to generate data about the subsurface resistivity distribution, which data is then used in an inverse calculation, a model of the electrical resistivity distribution can be obtained. The inverse model may be constrained by independent data to better define an inverse solution. The method utilizes pairs of electrically conductive (steel) borehole casings as current injection electrodes and as potential measurement electrodes. The greater the number of steel cased boreholes in an array, the greater the amount of data is obtained. The steel cased boreholes may be utilized for either current injection or potential measurement electrodes. The subsurface model produced by this method can be 2 or 3 dimensional in resistivity depending on the detail desired in the calculated resistivity distribution and the amount of data to constain the models.

13 Claims, 1 Drawing Sheet

ELECTRICAL RESISTANCE TOMOGRAPHY USING STEEL CASED BOREHOLES AS ELECTRODES

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to mapping the electrical resistivity distribution in a subsurface, particularly to electrical resistance tomography for mapping subsurface electrical resistivity distribution, and more particularly to a method which involves electrical resistance tomography using pairs of steel cased boreholes as electrodes to obtain data which is used in an inverse calculation to obtain a model of the electrical resistivity distribution in the subsurface.

Boreholes are drilled for many purposes. Many of these boreholes are cased with pipes or casings constructed of various materials including plastics and steel. It is often desired to know the subsurface properties near these boreholes and many techniques have been developed to provide this information. A more difficult problem, but one that is often just as important is to be able to determine the subsurface properties at some distance from the borehole. Again, methods have been developed and new methods are currently being developed for this use, especially for the need to interrogate the plane between the boreholes. Electrical resistivity tomography (ERT) is one of the methods which has been developed to satisfy this need. ERT is a method for determining the electrical resistivity distribution in a volume from discrete measurements of current and voltage made within the volume or on its surface. Resistivity survey have been typically performed using electrodes embedded in the soil or in a borehole. These prior approaches are exemplified by U.S. Pat Nos. 4,796,186; 4,820,989; and 4,882,542; and by W. Daily et al., "Cross-Borehole Resistivity Tomography", Geophysics, Vol. 56, No. 8 (August 1991), pp. 1228–1235; W. Daily et al., "Electrical Resistivity Tomography of Vadose Water Movement", Water Resources Research, Vol. 28, No. 5, pp. 1429–1442, May 1992; and C. J. Schenkel, "Resistivity Imaging Using A Steel Cased Well", UCRL-JC-121653, June 1995.

The present invention involves electrical resistance tomography (ERT) using steel cased boreholes as electrodes, instead of the conventional electrodes previously used to perform ERT. Typically, the conventional electrodes are several inches in length and a few inches wide; in contrast steel downhole casings are ten to thousands of feet in length and several (4–8) inches in diameter. By the use of existing steel borehole casings, or conductive metal liner, the need for additional drilling to emplace deep electrodes, and the associated cost, is reduced or eliminated depending on the number and location of the existing steel cased or conductive metal lined boreholes. Pairs of casings or liners are used as current injection electrodes and as potential measurement electrodes to generate data which sample the subsurface resistivity distribution. This data is used in an inverse calculation to obtain a model of the electrical resistivity distribution. The subsurface model can be two or three dimensional in resistivity depending on the detail desired in the calculated resistivity distribution.

SUMMARY OF THE INVENTION

It is an object of the present invention to provide an electrical resistance tomography (ERT) method.

A further object of the invention is to provide an ERT method using existing steel cased or electrically conductive metal lined boreholes as electrodes.

A further object of the invention is to carry out ERT using pairs of casings or liners as current injection and potential measurement electrodes.

Another object of the invention is to carry out ERT by obtaining data which sample the subsurface resistivity distribution and using the data in an inverse calculation to obtain a model of the electrical resistivity distribution.

Another object of the invention is to carry out ERT by using pairs of borehole casings as electrodes for generating data, and using the thus generated data in a mathematical inverse calculation to determine the resistivity distribution between the boreholes.

Other objects and advantages of the present invention will become apparent from the following description. Basically, the invention involves electrical resistance tomography (ERT) using pairs of steel cased or conductive metal lined boreholes as electrodes. Pairs of cased or lined boreholes are used as current injection electrodes and different pairs are used as potential measurement electrodes to generate data which sample the subsurface resistivity distribution. This data is then used in an inverse calculation to obtain a model of the electrical resistivity distribution. The subsurface model can be two or three dimensional in resistivity. The method of this invention enables a substantial reduction in cost by utilizing existing cased boreholes. Where existing boreholes have not been cased, a conductive metal liner may be inserted to function as the electrode. However, most boreholes are cased with steel casing and the existing steel casing functions as the electrodes for current injection or potential measurements. By using an array of boreholes, either for current injection or potential measurements, the data generated thereby provides a sample of the subsurface resistivity distribution in which the array of boreholes is located. Where a sufficient number of cased boreholes (long electrodes) do not exist in a selected area, additional boreholes will need to be drilled and cased or lined (or traditional point electrodes used to supplement) to enable generation of sufficient data to produce a model of the electrical resistivity distribution of that selected area.

The present invention can be utilized in environmental site characterization or monitoring of remedial processes; detecting and locating leaks from storage tanks, ponds, or landfills; or anywhere information on lateral variation in the subsurface is needed. Also, the invention finds use in monitoring the direction and the lateral extent of a steam flood or surfactant flood in an enhanced oil recovery operation; to determine the direction from which oil is coming from the formation as it flows into a production well; and to fill in information between boreholes in an oil field, such as map the lateral extent of a shale formation using the existing boreholes in the field as electrodes.

BRIEF DESCRIPTION OF THE DRAWINGS

The accompanying drawings, which are incorporated into and form a part of the disclosure illustrate test results of the invention and, together with the description, serve to explain the principles of the invention.

DETAILED DESCRIPTION OF THE INVENTION

Figure 2:
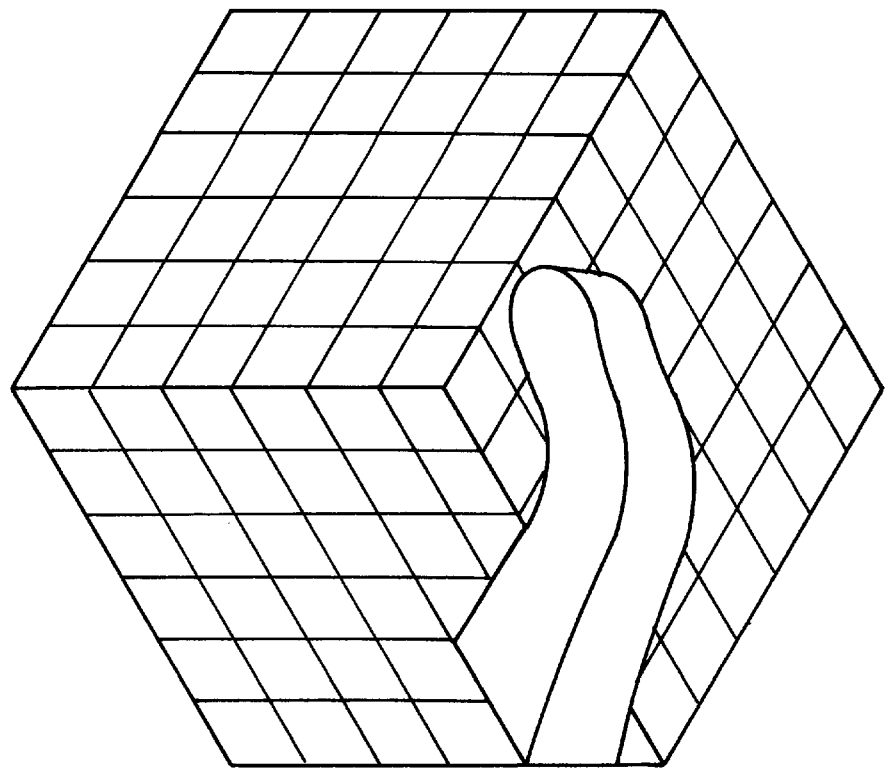
FIG. 2 illustrates the inverted resistivity of the steam flood of FIG. 1 obtained by the method of the present invention.

The invention relates to electrical resistance tomography (ERT) which is a technique for mapping the electrical resistivity distribution in the subsurface from measurements of electrical potential caused by electrical currents injected by an array of electrodes into the subsurface. ERT is carried out by using steel cased boreholes as electrodes to generate data which sample the subsurface resistivity distribution whereafter the data is used in an inverse mathematical calculation to obtain a model of the electrical resistivity distribution of the area from which the data was taken. The invention utilizes pairs of borehole casings as current injection and potential measurement electrodes to generate the data.

The ERT method of this invention is implemented, for example, where there is an array of existing boreholes in an area of interest which are cased with electrically conducting casing (e.g. steel casing or metal liner). A pair of casings are used for current injection. This electric source generates an electric potential distribution in the ground that is determined by the borehole location and depth, as well as the subsurface resistivity distribution. Other pairs of cased or lined boreholes of the array are used to measure this potential. Upon obtaining potential measurement at one pair of electrodes, another pair of the array of the cased boreholes are used as either the current injection electrodes or the potential measurement electrodes. Pairs of cased boreholes are utilized throughout the array to sample the potential field in the area of interest as completely as possible. In general, the more independent combinations of borehole pairs, either for current injection or potential measurement, that are possible, the more detailed will be the samples and thus the more linearly independent data available for the mathematical inversion. This method (source dipole with several receiver dipoles) is continued until the subsurface in the area of the borehole array is densely sampled. Often, the number of cased or lined boreholes available will limit the number of combinations and for such a case it would be best to acquire data from all linearly independent combinations to insure the most complete sampling possible.

The data obtained is then used to calculate the lateral variation in resistivity in the borehole array by finding a model of the resistivity distribution which would produce the same or nearly the same data. This calculation is known as an inverse problem in mathematics because it is in contrast to the forward problem (which is a much easier calculation). Several methods exist for solving this inverse problem, see above referenced articles entitled "Cross-Borehole Resistivity Tomography" and "Electrical Resistivity Tomography of Vadose Water Movement". Also, D. LaBrecque et al., "The Effects of Noise on Occam's Inversion of Resistivity Tomography Data", Geophysics, Vol. 61, No. 2, March–April 1996, pp. 538–548, used a Newton type optimization which searched for a solution with minimum roughness. The description of this invention is confined to the use of this (D. LaBrecque et al.) algorithm to make the description specific although the method could be used with other inverse algorithms.

A finite element model is formed of the resistivity distribution near to the borehole array. Various levels of sophistication are possible in this model. The level of detail that is practical will be determined by the number of boreholes in the array--or in other words, the amount of data available to constrain the model. A typical model might be two dimensional (2D) with the resistivity allowed to vary in the two horizontal directions but held constant in the vertical direction (parallel to vertical boreholes). For this case the values of these elements would be calculated consistent with the data and yield a 2D map of resistivity in the horizontal direction but vertically averaged over the length of the borehole casing. This approach may be used for finding gross anomalous regions such as detecting large conductive plumes forming under a surface storage tank.

If more detailed information is desired, this method can be augmented with other data and a three dimensional (3D) model made. For this case, part of the model is constrained by the supplemental data and part is constrained by the voltage-current data from the borehole array. By way of example, the supplemental data may include data from point electrodes which may be located in other boreholes or on the surface.

As an example, consider an oil field steam flood. The goal is to determine the direction and extent of the stream front from the injection well. It will be assumed, which is safe for this case, that the borehole electrical logs are available from the borehole array taken prior to hole completion. These logs are used to define a resistivity model which will be reasonably accurate if the geology is simple. In the reconstruction (inverse problem), part of the model is constrained to remain constant where no changes are expected to take place during the steam flood. On the other hand, the elements are allowed to vary, only in the region where there is a reasonable expectation of steam to penetrate the formation. This model is fit to the data to yield an estimate of the steam front direction and extent from the injection well using a prior knowledge to constrain solutions.

Figure 1:
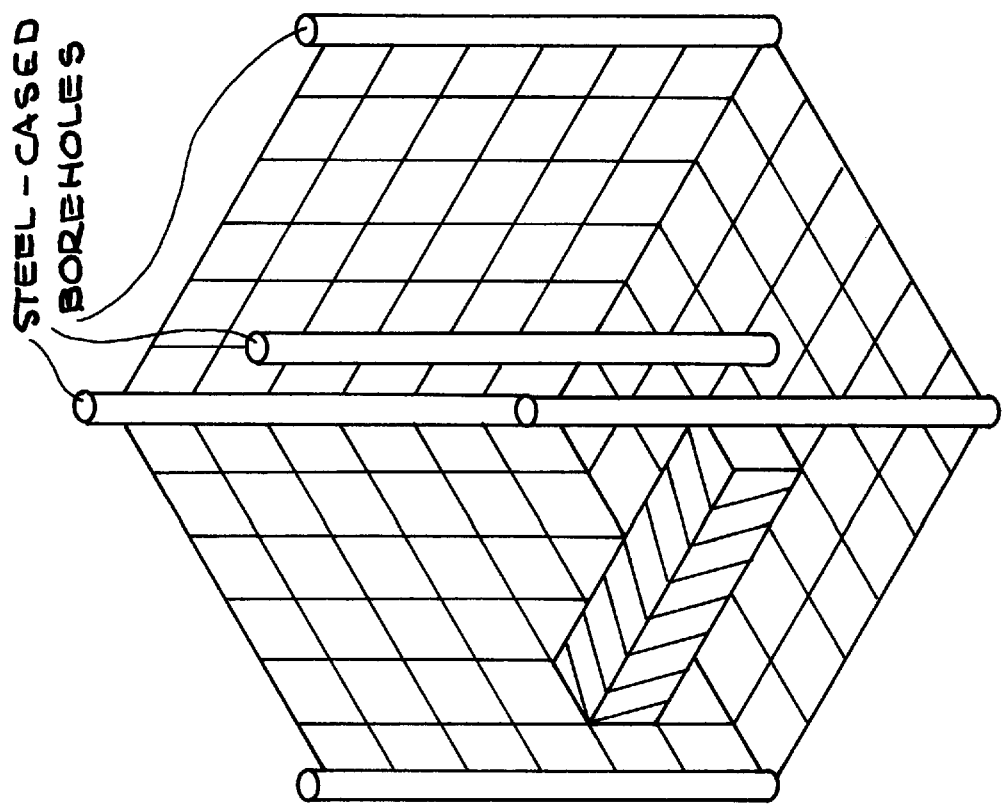
FIG. 1 illustrates a computer simulated underground steam flood model resistivity located adjacent a plurality of steel-cased boreholes.

While field experiments have not yet been undertaken to verify the present invention, extensive studies and computer simulations have been carried out. FIG. 1 illustrates a model of an underground steam flood located adjacent a plurality of steel-cased boreholes. The steel borehole casings had a length of 4000 feet and a diameter of 8.0 inches, with a wall thickness of 0.25 inches. In this simulated test it was desired to obtain the location of the steam flood and direction of flow. Electrical current was injected through pairs of the steel casings and potential measurements were obtained from other pairs of the steel casings in accordance with the invention. The injected current in the range of 0.5 to 5A was supplied by a source producing a voltage of up to 1000 volts. The potential measured at the pairs of measurement steel casings was in the range of 20 mV to 2 volts. The thus generated data obtained from various pairs of current injection electrodes (steel casings) by various pairs of potential measurement electrodes (steel casings) was utilized in an inverted mathematical calculation to obtain a model of the electrical resistivity distribution. The model obtained from the generated data from the FIG. 1 steam flood is illustrated in FIG. 2. This model is constrained so that model parameters were allowed to change only in the layer of reconstruction blocks in the rest of the bottom layer (Constraining the inverse model by a prior information is an important component of the invention to make it of practical value). While the inverted model of FIG. 2 differs in configuration from the initial steam flood model of FIG. 1, the approximate location and direction of flow can be seen from the inverted model, thus verifying the method of the present invention.

It has thus been shown that the method of the present invention enables mapping the electrical resistivity distribution in the subsurface from measurements of electrical potential caused by electrical currents injected via pairs of existing steel borehole casings, with the potential measurement being obtained by pairs of existing steel borehole casings. The thus generated data then being utilized in an inverse calculation to produce a model of the electrical resistivity distribution of the area from which the data was obtained.

While a particular operational approach has been described or illustrated, including materials, depths, potentials, etc., have been set forth to exemplify and explain the principles of the invention, such are not intended to be limiting. Modifications and changes may become apparent to those skilled in this field, and it is intended that the invention be limited only by the scope of the appended claims.

The invention claimed is:

1. An electrical resistance tomography method, comprising:

injecting current into a subsurface using a pair of conductive borehole casings as electrodes;

measuring potential in the subsurface using another pair of borehole casings as electrodes; and utilizing the measured potential in an inverse calculation to form a model of the electrical resistivity distribution of an area from which the measured potential was obtained.

2. The method of claim 1, wherein the conductive borehole casings are formed of steel.

3. The method of claim 1, additionally including utilizing existing conductive borehole casings as the current injecting and potential measuring electrodes.

4. The method of claim 1, additionally including providing existing boreholes with conductive casings for utilizing as electrodes.

5. A method for forming a model of the electrical resistivity distribution of a subsurface area having a plurality of steel cased boreholes, comprising:

utilizing a first pair of the steel cased boreholes for injecting current into the subsurface;

utilizing a second pair of the steel cased boreholes for measuring electrical potential in the subsurface;

recording the thus measured potential from the second pair of steel cased boreholes;

utilizing another pair of the plurality of steel cased boreholes for injecting current into the subsurface;

utilizing another pair of the plurality of steel cased boreholes for measuring electrical potential in the subsurface;

recording the thus measured potential from another pair of steel cased boreholes;

utilizing an nth pair of the plurality of steel cased boreholes for injecting current into the subsurface;

utilizing a nth pair of the plurality of steel cased boreholes for measuring electrical potential in the subsurface;

recording the thus measured potential from the nth pair of steel cased boreholes; and forming a model of the electrical resistivity distribution from the recorded measured potential from the second pair, another pair and nth pair of steel cased boreholes using an inverse calculation.

6. The method of claim 5, wherein any pair of said plurality of steel cased boreholes are utilized for current injection and for potential measurement.

7. In a method for mapping the electrical resistivity distribution in a subsurface from measurement of electrical potential caused by electrical currents injected into the subsurface by electrodes, the improvement comprising:

utilizing different pairs of existing steel cased boreholes as current injection electrodes and utilizing different pairs of existing steel cased boreholes s electrical potential measurement electrodes.

8. The improvement of claim 7, additionally including interchanging the steel cased boreholes such that any pair of the existing boreholes may be utilized as electrodes for current injection or for potential measurement.

9. The improvement of claim 8, additionally including utilizing pairs of the existing boreholes such that each borehole is utilized as an electrode in one of a pair of electrodes for current injection and for potential measurement.

10. The improvement of claim 7, additionally including substituting point electrodes for borehole electrodes.

11. The improvement of claim 7, additionally including constraining a solution to two dimentional to reduce degrees of freedom.

12. The improvement of claim 7, additionally including using a three dimensional solution and constraining portions of the three dimensional model using independent data.

13. The improvement of claim 7, additionally including modeling the steel casing electrodes as electrically conducting structures in a three dimensional model or as infinitely long line electrodes in a two dimensional model.

* * * * *